Feb. 17, 1970 SHIH Y. TONG 3,496,549

CHANNEL MONITOR FOR ERROR CONTROL

Filed April 20, 1966 10 Sheets-Sheet 1

INVENTOR
S.Y. TONG
BY Lucian C. Canepa
ATTORNEY

CHANNEL MONITOR FOR ERROR CONTROL

Filed April 20, 1966 10 Sheets-Sheet 2

| STATE | $P_1$ | $P_2$ | $P_3$ |
|---|---|---|---|
| A | 0 | 0 | 0 |
| B | 0 | 0 | 1 |
| C | 0 | 1 | 1 |
| D | 1 | 1 | 1 |
| E | 1 | 1 | 0 |
| F | 1 | 0 | 0 |

Feb. 17, 1970 SHIH Y. TONG 3,496,549

CHANNEL MONITOR FOR ERROR CONTROL

Filed April 20, 1966 10 Sheets-Sheet 3

FIG. 6

STRATEGY PM000

| STATE \ NO. OF ERRORS | 0 | 1 | 2 | 3 | 4 OR MORE | OUTPUT |
|---|---|---|---|---|---|---|
| A | A | A | A | A | B | GOOD STATE |
| B | C | B | B | B | B | BAD STATE |
| C | D | C | B | B | B | BAD STATE |
| D | E | D | C | B | B | BAD STATE |
| E | F | E | D | C | B | BAD STATE |
| F | A | F | E | D | B | GOOD STATE |

FIG. 7

STRATEGY PM001

| STATE \ NO. OF ERRORS | 0 | 1 | 2 | 3 | 4 OR MORE | OUTPUT |
|---|---|---|---|---|---|---|
| A | A | A | A | A | B | GOOD STATE |
| B | C | B | B | B | B | BAD STATE |
| C | D | C | B | B | B | BAD STATE |
| D | E | D | C | B | B | BAD STATE |
| E | F | E | D | C | B | BAD STATE |
| F | A | F | E | D | B | BAD STATE |

FIG. 8

STRATEGY PM010

| STATE \ NO. OF ERRORS | 0 | 1 | 2 | 3 | 4 OR MORE | OUTPUT |
|---|---|---|---|---|---|---|
| A | A | A | A | F | B | GOOD STATE |
| B | C | B | B | B | B | BAD STATE |
| C | D | C | B | B | B | BAD STATE |
| D | E | D | C | B | B | BAD STATE |
| E | F | E | D | C | B | BAD STATE |
| F | A | F | E | D | B | GOOD STATE |

FIG. 9 STRATEGY PM011

| STATE \ NO. OF ERRORS | 0 | 1 | 2 | 3 | 4 OR MORE | OUTPUT |
|---|---|---|---|---|---|---|
| A | A | A | A | F | B | GOOD STATE |
| B | C | B | B | B | B | BAD STATE |
| C | D | C | B | B | B | BAD STATE |
| D | E | D | C | B | B | BAD STATE |
| E | F | E | D | C | B | BAD STATE |
| F | A | F | E | D | B | BAD STATE |

FIG. 10 STRATEGY PM100

| STATE \ NO. OF ERRORS | 0 | 1 | 2 | 3 | 4 OR MORE | OUTPUT |
|---|---|---|---|---|---|---|
| A | A | A | A | A | B | GOOD STATE |
| B | C | B | B | B | B | BAD STATE |
| C | D | C | B | B | B | BAD STATE |
| D | E | D | C | B | B | BAD STATE |
| E | F | E | D | B | B | BAD STATE |
| F | A | F | E | B | B | GOOD STATE |

FIG. 11 STRATEGY PM101

| STATE \ NO. OF ERRORS | 0 | 1 | 2 | 3 | 4 OR MORE | OUTPUT |
|---|---|---|---|---|---|---|
| A | A | A | A | A | B | GOOD STATE |
| B | C | B | B | B | B | BAD STATE |
| C | D | C | B | B | B | BAD STATE |
| D | E | D | C | B | B | BAD STATE |
| E | F | E | D | B | B | BAD STATE |
| F | A | F | E | B | B | BAD STATE |

FIG. 12

STRATEGY PM110

| STATE \ NO. OF ERRORS | 0 | 1 | 2 | 3 | 4 OR MORE | OUTPUT |
|---|---|---|---|---|---|---|
| A | A | A | A | F | B | GOOD STATE |
| B | C | B | B | B | B | BAD STATE |
| C | D | C | B | B | B | BAD STATE |
| D | E | D | C | B | B | BAD STATE |
| E | F | E | D | B | B | BAD STATE |
| F | A | F | E | B | B | GOOD STATE |

FIG. 13

STRATEGY PM111

| STATE \ NO. OF ERRORS | 0 | 1 | 2 | 3 | 4 OR MORE | OUTPUT |
|---|---|---|---|---|---|---|
| A | A | A | A | F | B | GOOD STATE |
| B | C | B | B | B | B | BAD STATE |
| C | D | C | B | B | B | BAD STATE |
| D | E | D | C | B | B | BAD STATE |
| E | F | E | D | B | B | BAD STATE |
| F | A | F | E | B | B | BAD STATE |

FIG. 14

STRATEGY PM200

| STATE \ NO. OF ERRORS | 0 | 1 | 2 | 3 | 4 OR MORE | OUTPUT |
|---|---|---|---|---|---|---|
| A | A | A | A | A | B | GOOD STATE |
| B | C | B | B | B | B | BAD STATE |
| C | D | C | B | B | B | BAD STATE |
| D | E | D | B | B | B | BAD STATE |
| E | F | E | B | B | B | BAD STATE |
| F | A | F | B | B | B | GOOD STATE |

FIG. 15

STRATEGY PM201

| STATE \ NO. OF ERRORS | 0 | 1 | 2 | 3 | 4 OR MORE | OUTPUT |
|---|---|---|---|---|---|---|
| A | A | A | A | A | B | GOOD STATE |
| B | C | B | B | B | B | BAD STATE |
| C | D | C | B | B | B | BAD STATE |
| D | E | D | B | B | B | BAD STATE |
| E | F | E | B | B | B | BAD STATE |
| F | A | F | B | B | B | BAD STATE |

FIG. 16

STRATEGY PM210

| STATE \ NO. OF ERRORS | 0 | 1 | 2 | 3 | 4 OR MORE | OUTPUT |
|---|---|---|---|---|---|---|
| A | A | A | A | F | B | GOOD STATE |
| B | C | B | B | B | B | BAD STATE |
| C | D | C | B | B | B | BAD STATE |
| D | E | D | B | B | B | BAD STATE |
| E | F | E | B | B | B | BAD STATE |
| F | A | F | B | B | B | GOOD STATE |

FIG. 17

STRATEGY PM211

| STATE \ NO. OF ERRORS | 0 | 1 | 2 | 3 | 4 OR MORE | OUTPUT |
|---|---|---|---|---|---|---|
| A | A | A | A | F | B | GOOD STATE |
| B | C | B | B | B | B | BAD STATE |
| C | D | C | B | B | B | BAD STATE |
| D | E | D | B | B | B | BAD STATE |
| E | F | E | B | B | B | BAD STATE |
| F | A | F | B | B | B | BAD STATE |

FIG. 18

STRATEGY PM300

| NO. OF ERRORS / STATE | 0 | 1 | 2 | 3 | 4 OR MORE | OUTPUT |
|---|---|---|---|---|---|---|
| A | A | A | A | A | B | GOOD STATE |
| B | C | B | B | B | B | BAD STATE |
| C | D | B | B | B | B | BAD STATE |
| D | E | B | B | B | B | BAD STATE |
| E | F | B | B | B | B | BAD STATE |
| F | A | B | B | B | B | GOOD STATE |

FIG. 19

STRATEGY PM301

| NO. OF ERRORS / STATE | 0 | 1 | 2 | 3 | 4 OR MORE | OUTPUT |
|---|---|---|---|---|---|---|
| A | A | A | A | A | B | GOOD STATE |
| B | C | B | B | B | B | BAD STATE |
| C | D | B | B | B | B | BAD STATE |
| D | E | B | B | B | B | BAD STATE |
| E | F | B | B | B | B | BAD STATE |
| F | A | B | B | B | B | BAD STATE |

FIG. 20

STRATEGY PM310

| NO. OF ERRORS / STATE | 0 | 1 | 2 | 3 | 4 OR MORE | OUTPUT |
|---|---|---|---|---|---|---|
| A | A | A | A | F | B | GOOD STATE |
| B | C | B | B | B | B | BAD STATE |
| C | D | B | B | B | B | BAD STATE |
| D | E | B | B | B | B | BAD STATE |
| E | F | B | B | B | B | BAD STATE |
| F | A | B | B | B | B | GOOD STATE |

FIG. 21

STRATEGY PM311

| NO. OF ERRORS / STATE | 0 | 1 | 2 | 3 | 4 OR MORE | OUTPUT |
|---|---|---|---|---|---|---|
| A | A | A | A | F | B | GOOD STATE |
| B | C | B | B | B | B | BAD STATE |
| C | D | B | B | B | B | BAD STATE |
| D | E | B | B | B | B | BAD STATE |
| E | F | B | B | B | B | BAD STATE |
| F | A | B | B | B | B | BAD STATE |

FIG. 22

STRATEGY FM
(FUNDEMENTAL MODE)

| INPUT / STATE | 0 | 1 | 2 | 3 | 4 OR MORE | OUTPUT |
|---|---|---|---|---|---|---|
| A | A | A | A | A | B | GOOD STATE |
| B | A | B | B | B | B | BAD STATE |

United States Patent Office 3,496,549
Patented Feb. 17, 1970

3,496,549

CHANNEL MONITOR FOR ERROR CONTROL

Shih Y. Tong, Middletown, N.J., assignor to Bell Telephone Laboratories, Incorporated, New York, N.Y., a corporation of New York Filed Apr. 20, 1966, Ser. No. 543,835
Int. Cl. G06f *11/00;* G08b *29/00;* G11b *13/00*
U.S. Cl. 340—172.5 3 Claims

ABSTRACT OF THE DISCLOSURE

A channel monitor is disclosed for use with digital data transmission systems which employ error control features. In association with such systems, the channel monitor receives from the data system decoder an error count which indicates the inumber of errors in each received code word. From this error count a determination is made by the monitor whether or not to change the error control procedure of the system according to one of several preselected strategies. When the data channel is subjected to excessive burst noise, for example, it may be desirable to change from a forward acting error correction procedure to error detection and retransmission.

This invention relates to digital data processing systems and more particularly to the automatic detection and correction of errors in such systems.

The need for accurate transmission and processing of digital data is well recognized in such areas as telegraphy, telephonyl, and computer and automation technology. Most often, such digital data is represented or coded in sequences of binary signals (hereafter referred to as bits). Each position in any sequence or code word consists of a bit "0" or "1," the different code word permutations of bits representing different items of information. Of course, longer messages can be represented by combinations of code words just as the symbols of an alphabet are used to construct words and then words used to construct sentences.

Methods of improving the accuracy of transmission of binary information may be broadly classified as error detection and retransmission or forward-acting error correction. The first method may consist simply of the appending of a single bit to each code word to be transmitted so as to give each word an even number of "1's" (or alternatively an even number of "0's"). Each code word would then be considered as having even parity. If an odd number of errors (transmutting a "1" to a "0" or vice-versa) occurred in transmission, the received word would be detected as having odd parity rather than the expected even parity, thus indicating that an error(s) had occurred. Upon detection of an error, the receiving end would signal the transmitting end to retransmit the erroneously-received word.

The more elaborate method of improving accuracy of data transmission is forward-acting error correction. One approach to this method is to deliberately choose special code words to represent the information or data. If the number of errors in a received word does not exceed the so-called error-correcting ability of the code, then the received word can be processed to determine specifically what bit positions were received in error. From this determination, the received word can be properly corrected. Examples of such codes are discussed in detail in "Error-Correcting Codes" by W. W. Peterson, The M.I.T. Press and John Wiley & Sons, 1961.

A large number of codes may be used either for error detection-retransmission or for forward-acting error correction (and in some cases for both). For example, the Hamming (7, 4) code, consisting of four information digits and three redundant or check digits could be used either for double-error detection or for single-error correction.

Error detection and retransmission affords better protection against errors than does forward-acting error correction, but is generally slower (the rate of transmission of information is reduced) because retransmissions are required when errors are detected.

The appropriate choice of a specific method of error control depends in large degree on the error characteristics of the transmission channel being employed. On some channels, errors may occur predominantly in bursts, while on others the errors may be randomly distributed. Still others may be subject to both types of errors. It is well known, for example, that digital data errors in telephone circuits occur primarily in bursts, although there is some occurrence of randomly-distributed errors. It would be desirable to provide for correcting randomly-distributed errors without excessive redundancy while also providing for the correction of burst errors. The problem of choosing the appropriate coding scheme for any particular data system which is subject to both types of errors is apparent.

A. C. Rose Patent 3,078,443, granted Feb. 19, 1963, discloses that several error control schemes each utilizing different encoding and decoding equipment might be employed on the same transmission channel and that as the error rate on the channel varied, the appropriate error control scheme be utilized. No suggestion has been made heretofore, however, for allowing for more than a single fixed strategy for determining which error control mode is appropriate at any particular time or for allowing a data system user to select from several strategies that one which best satisfies his needs.

Accordingly, an object of the present invention is an error control system which provides for efficiently controlling both random errors and burst errors.

Another object of the present invention is a transmission channel monitor for initiating a change in error control algorithms of an error control system upon determination of the existence of certain error conditions on the channel.

A further object of the present invention is a channel monitor having several manually selectable strategies for determining when to change error control algorithms.

These and other objects of the present invention are realized in a specific illustrative embodiment which comprises a novel channel monitor in combination with a data transmission, error control system having a decoder capable of utilizing at least two decoding algorithms and an identification circuit for determining (within the capacity of the code being utilized) the number of errors in each received word. From information obtained from the decoder, the identification circuit determines the number of errors in the received code words. This error count is then transmitted to the channel monitor which determines therefrom, according to one of several preselected strategies, whether or not to change the error control mode (decoding algorithm) of the data system. If, for example, the data transmission channel were suddenly subjected to excessive burst noise, a change from a less reliable but faster forward-acting error correction mode to a more reliable but slower mode of error detection-retransmission might be desirable.

The logical strategy utilized by the channel monitor for determining whether or not to change the error control mode of the system is manually selectable. This allows the data system user to fix the degree of accuracy or alternatively the data reception rate which he desires. It also allows for the maintenance of a particular reception rate in the face of long term channel degradation. For example, if the error conditions of the channel became so poor that the system's error control procedure were maintained (by the monitor) in a highly reliable but low reception rate mode, the user could manually select a decision strategy which would maintain the system in a less reliable but higher reception rate mode and thus increase the reception rate to the desired level.

It is a feature of the present invention that an error control system which comprises a decoder having two or more modes of error control and an identification circuit responsive to signals received from the decoder for determining the number of errors per received word, include in combination therewith a channel monitor which in response to the error determination of the identification circuit and in accordance with a certain descision strategy, supplies a positive signal to the decoder as to what, if any, change in the mode of error control is desired.

It is another feature of this invention that the channel monitor be equipped for allowing manual selection of one of a multiplicity of decision strategies for determining when to change the error control mode of the system.

A complete understanding of the present invention and of the above and other objects, features and advantages thereof, may be gained from a consideration of the following detailed descriptions of specific illustrative embodiments presented hereinbelow in connection with the accompanying drawing, in which.

Figure 1:
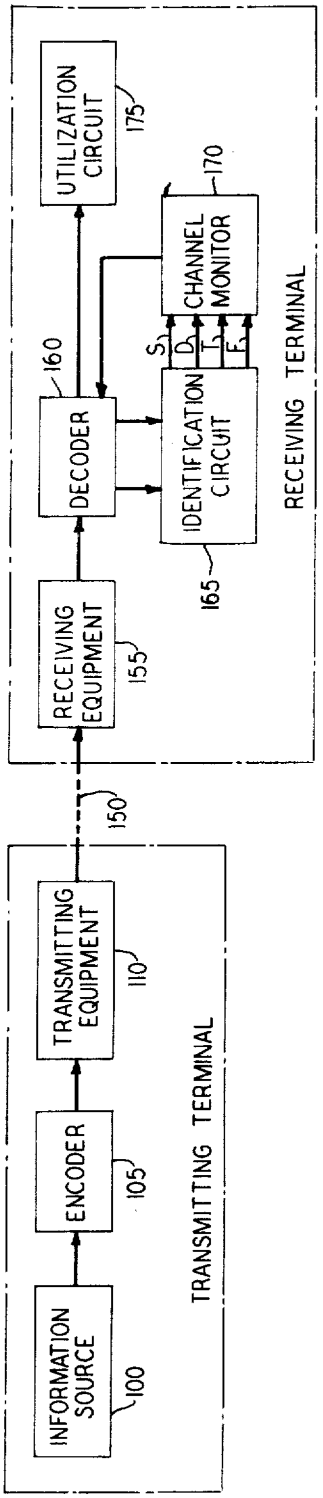
FIG. 1 is a block diagram of an error control system which includes a novel channel monitor combined therewith in accordance with the principles of the present invention.
Figure 2:
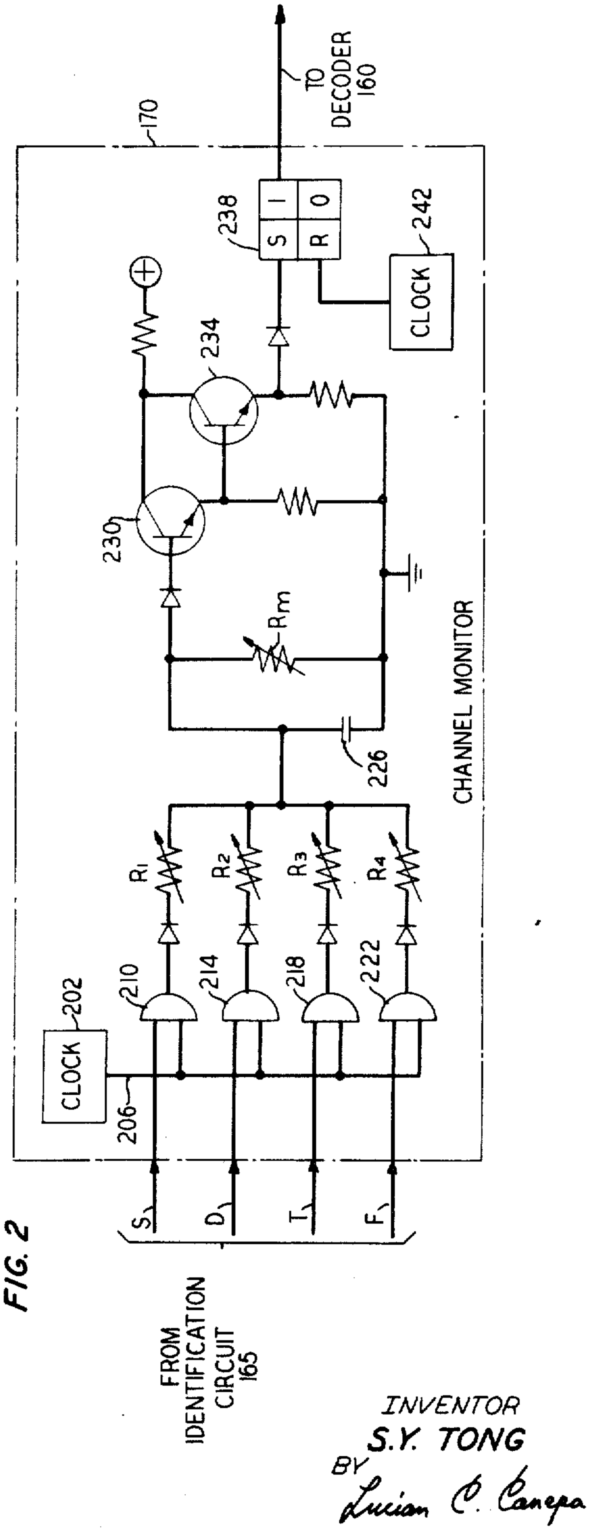
FIG. 2 is a detailed showing of a specific illustrative analog embodiment of the channel monitor shown in FIG. 1.
Figures 3, 5:
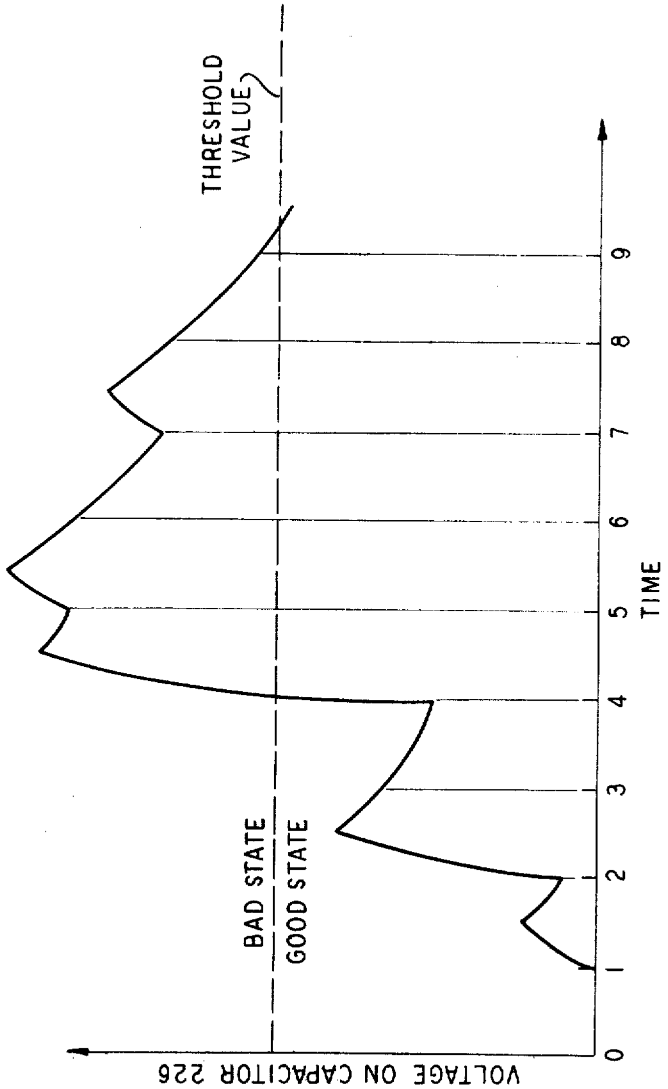
Figure 4:
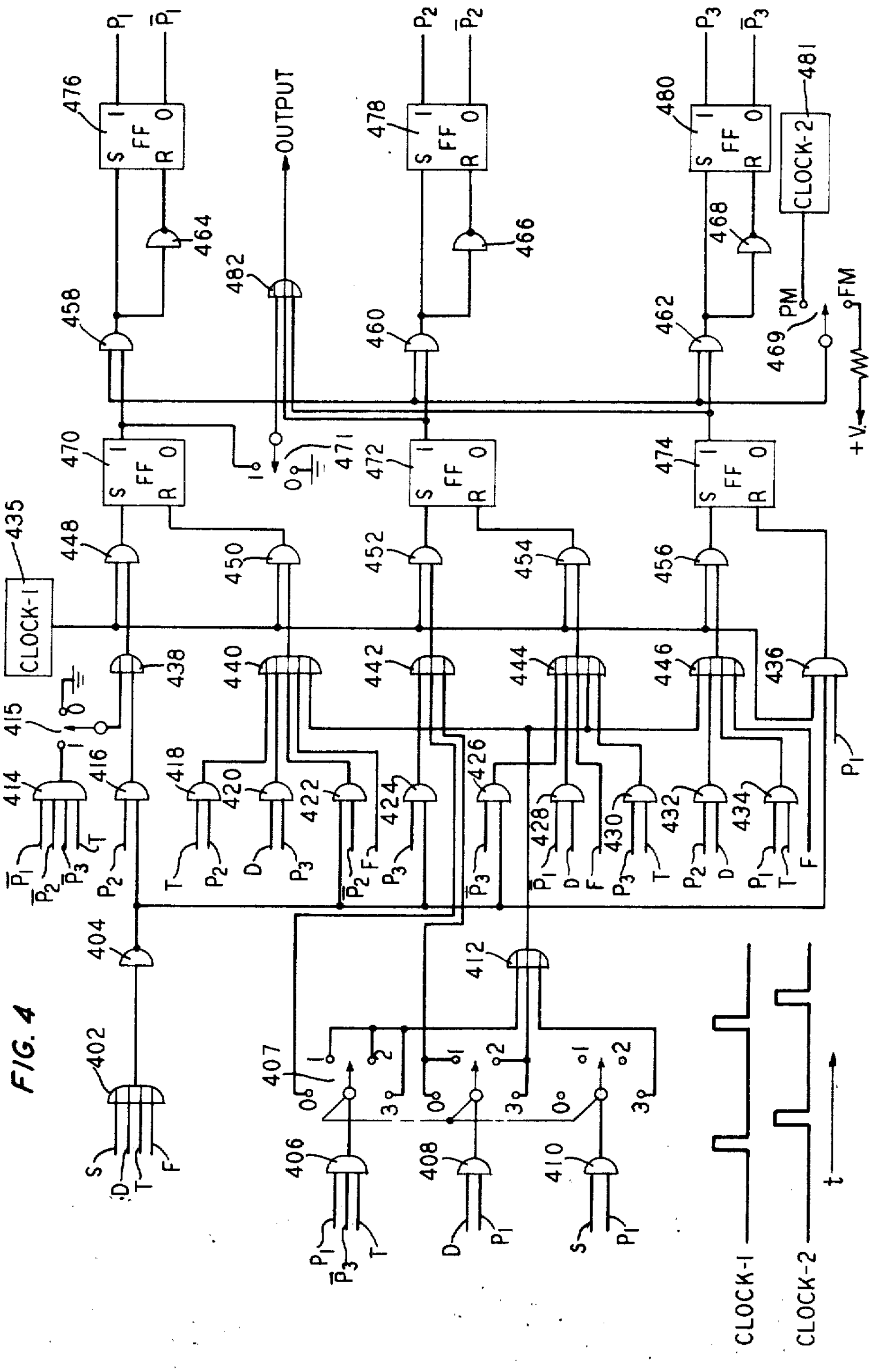
Figure 23:
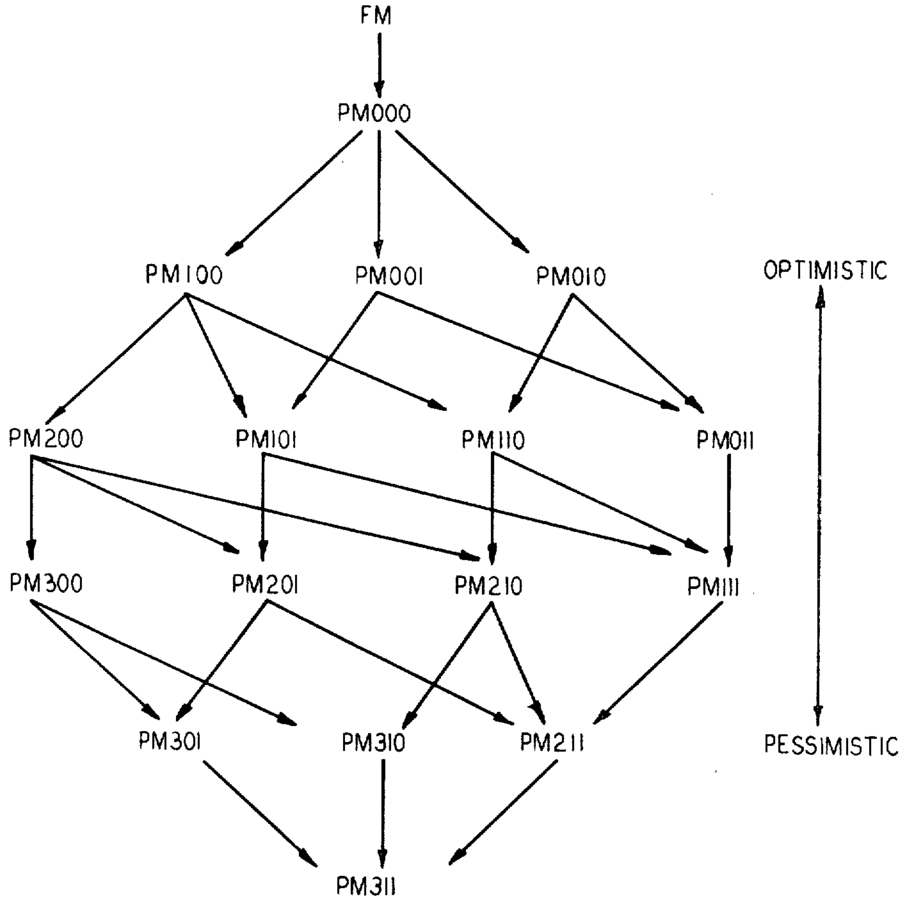

FIG. 3 graphically shows how the voltage level on the capacitor 226 of FIG. 2 varies with time, given various hypothetical error-count inputs;

FIG. 4 details a specific illustrative digital embodiment of the channel monitor shown in FIG. 1;

FIG. 5 shows the state assignments of the digital channel monitor of FIG. 4;

FIGS. 6–22 show the logical state tables representative of the seventeen decision strategies of the digital channel monitor of FIG. 4; and FIG. 23 illustrates the relationship among the strategies represented in FIGS. 6–22.

The data transmission, error control system shown in FIG. 1 includes an information source 100 for supplying successive binary data signals to an encoder 105 for encoding into redundant binary sequences. Such sequences contain a sufficient number of redundant bits to provide for at least two modes of error control—for example, forward-acting error correction or detection-retransmission. These sequences are then delivered to associated transmitting equipment 110 for transmission over an error-prone transmission channel 150.

After the binary sequences or code words are received by standard receiving equipment 155, they are delivered to a conventional decoder 160 for decoding according to one of several possible decoding algorithms, depending on the previously-determined error condition of the transmission channel (to be explained). If, for example, the decoder 160 where operating in an error detection-retransmission mode, and an error or errors were detected, then a request-for-retransmission signal would be transmitted to the transmitting terminal (the means for doing this is not illustrated in FIG. 1). If the decoder 160 were operating in a forward-acting error control mode, then all correctable errors would be automatically corrected by the decoder.

After each received word is decoded, the decoder 160 applies signals to an identification circuit 165 from which the identification circuit determines the number of bits in error in the received word. This determination is then transmitted by the identification circuit 165 to a channel monitor 170. For illustrative purposes, FIG. 1 shows four leads connecting the identification circuit and the channel monitor. The lead labeled "S" represents that lead which would be activated if it were determined that a single error occurred. The "D" lead would be activated for a double error determination, the "T" lead for a triple error determination and the "F" lead if it were determined that four or more errors occurred. This representation, of course, assumes that the code utilized has at least a quadruple error-detecting ability.

A copending application by H. O. Burton, Ser. No. 429,386, filed Feb. 1, 1965, now Patent 3,389,375, issued June 18, 1968, describes a particular identification circuit which can, illustratively, be utilized in the above-described system for the circuit 165.

Depending on the error indication received from the identification circuit 165 and according to a manually preselected decision strategy, the channel monitor 170 determines whether or not to initiate a change in error control alogriths of the decoder 160. If it is determined that a change is to be made, then the monitor 170 applies the appropriate signal (indicating that a change is desired) to the decoder. Illustratively, the decoder 160 is of the type described in the previously cited Peterson text.

Two specific embodiments of the channel monitor 170 shown in FIG. 1 will now be described.

The first is an analog-type channel monitor, shown in FIG. 2. The inputs to the monitor, designated S, D, T and F, correspond to the four leads similarly designated and shown in FIG. 1 connecting the identification circuit 165 and the channel monitor 170. After a received code word has been decoded and the error count determined by the identification circuit, lead S, D, T or F is activated in response to a determination that one, two, three, or four or greater errors have occurred respectively. Activation of one of the four mentioned leads in conjunction with a clock 202 activating lead 206 for a predetermined period of time enables one of four AND gates 210, 214, 218, 222 shown in FIG. 2. Thus a certain amount of electrical charge is deposited on a capacitor 226, depending on the setting of a variable resistor associated with the AND gate which is enabled. For example, if it were desired to give a small weighting to single errors, the variable resistor $R_1$ would be set to a high resistance value. Thus, the effect of a single error occurrence would be to charge the capacitor 226 only slightly. The effect of the other error patterns can, likewise, be controlled by varying the resistance of the resistors $R_2$, $R_3$ and $R_4$. Different error patterns will thus charge the capacitor 226 at different rates.

The capacitor 226 serves as a memory element to reflect the error conditions of the channel. When many errors occur, the capacitor will reflect this by having a relatively high level of charge. (Of course all error patterns could be made to charge the capacitor at the same rate but this would defeat the purpose of the invention.) Variable resistor $R_m$ is used to control the leakage from the capacitor 226 and thus control the amount of charge on the capacitor at any particular time. When the charge and voltage on the capacitor 226 exceed some predetermined value, an associated transistor 230 is made to conduct which in turn causes transistor 234 to "turn on." A flip-flop 238 is thus set, indicating that the number of channel errors has reached that threshold level at which it is desired to change the error control mode.

The transistor configuration shown in FIG. 2 is a well-known "emitter-follower" arrangement which has the characteristic of a high input impedance and low output impedance. The emitter-follower prevents leakage from the capacitor 226 through the transistors.

Following the deposit of charge on the capacitor 226 and the setting of the flip-flop 238, and just before receipt of the next code word, a clock 242 applies a reset pulse to the flip-flop 238. If the charge on the capacitor 226 at this time is insufficient to maintain the emitter-follower in the "ON" condition, then the flip-flop 238 will be reset. If the charge is sufficient, then the flip-flop will remain in the set condition.

As indicated above, the appropriate adjustment or setting of $R_m$, $R_1$, $R_2$, $R_3$ and $R_4$ of the analog monitor shown in FIG. 2 gives a large variety of strategies for determining when to change the error control mode of the data system.

FIG. 3 graphically illustrates how the voltage level on the capacitor 226 of FIG. 2 might vary as a function of time. Each of the intervals numbered one through nine on the abscissa represents the time from receipt of one error count by the analog channel monitor (FIG. 2) to the time the next error count is received. Intervals 2, 6 and 8, for example, show how the capacitor might charge with a single-error input. Interval 3 represents a triple-error input, interval 4 a zero-error input, and interval 5 a four-or-more-error input. With the interval 5 input, the voltage on the capacitor is shown to have exceeded the threshold value, which would result in the error control mode being changed. The "bad state" is subsequently maintained for approximately five intervals.

An illustrative digital embodiment of a channel monitor made in accordance with the present invention is shown in FIG. 4. The four inputs S, D, T and F are the same as those previously discussed in connection with FIGS. 1 and 2. That is, S represents a single error in the received word, D a double error, etc. The single-error input S appears at OR gate 402 and AND gate 410, the double-error input D at the OR gate 402 and AND gates 408, 420, 428 and 432, the triple-error input T at the OR gate 402 and AND gates 406, 414, 418, 430 and 434 and the four-or-more-error input F at OR gates 402, 440, 444 and 446. The inputs identified as either $P_x$ or $\overline{P_x}$ where $x=1$, 2 or 3 are simply the outputs of flip-flops 476, 478 or 480 shown in FIG. 4. The ultimate output of the monitor is from OR gate 482. A "high" output indicates that the transmission channel is in a bad state (subject to excessive errors) whereas a "low" output indicates that the channel is in a good state.

The depicted digital channel monitor is a finite state machine having six designated states as shown in FIG. 5. The state of the system at any particular time is identified according to the condition of the flip-flops 476, 478 and 480 of FIG. 4. For example, when all the aforementioned flip-flops are in the set state $$(\text{i.e. } P_1=P_2=P_3=1)$$

then the system is in state D (FIG. 5). If all the mentioned flip-flops are in the reset state ($P_1=P_2=P_3=0$), then the system is in state A, and so on.

Transitions from one state to another take place as a result of various error pattern inputs and upon the application of clock pulses by clocks 435 and 481 (FIG. 4). The clock 435 (clock 1) is arranged to outpulse just before the clock 481 (clock 2) so that the pulse from the clock 435 has "died out" before the pulse from the clock 481 is applied. This arrangement provides for no more than a single state transition per pair of clock pulses, providing a switch 469 is switched to the clock 481 via a PM (pulse mode) contact. (Because of this arrangement, the width of the clock pulses and the circuit delays are not critical to the operation of the system, as they are many times in the operation of other finite state machines. That is, the monitor of FIG. 4 is "speed independent.") If the switch 469 is switched to the FM (fundamental mode) contact, then multiple state transitions are possible. This will be explained in more detail later.

Switches 407, 415 and 471 set in various combinations (with the switch 469 set in the pulse mode [PM]) provide for 16 different strategies of operation of the digital channel monitor shown in FIG. 4. These strategies determine what combinations of error count inputs will cause what state transitions to take place. When the switch 469 is set in the fundamental mode (FM), the system operates in only one manner regardless of the other switch settings. Thus a total of seventeen different strategies are available. The particular strategies will be identified as FM for the fundamental mode or as PM *abc* for the pulse mode, where *a* corresponds to switch 407's setting, *b* switch 415's setting, and *c* to switch 471's setting.

The operation of the system will now be described by way of example. Assume that the switches 407, 415 and 471 are set in their "0" position and the switch 469 in its PM position. This particular strategy can be identified as PM 000. Further assume that the system is presently in state E (FIG. 5) corresponding to $P_1=1$, $P_2=1$ and $P_3=0$ (i.e. the flip-flops 476 and 478 in the set state and the flip-flop 480 in the reset state). It should be noted that following the application of a clock pulse from the clock 481, the flip-flops 476, 478 and 480 always assume the same state as flip-flops 470, 372 and 474, respectively. For the present state of the system given above, the output of the monitor (from the OR gate 482) is "high" indicating that according to the strategy being used, the transmission channel is in a "bad" state.

Finally, assume that a "no-error" count is applied to the monitor of FIG. 4. This means that none of the leads S, D, T or F is in the "high" condition and, consequently, that the OR gate 402 applies a "low" or a "0" condition to an AND-NOT gate 404. The AND-NOT gate 404, in turn, applies a logical "1" signal to the AND gates 416, 422, 424, 426 and 436. Since the flip-flop 480 is in the reset state, that is, $\overline{P_3}=1$, the AND gate 426 is enabled. The output of the gate 426 enables the OR gate 444 which then combines with a pulse from the clock 435 to enable the AND gate 454. The output of the gate 454 resets the flip-flop 472 which, in turn, disables the OR gate 482, causing the output of the system to assume a "low" condition, thereby indicating that the transmission channel is in a "good" state. The AND gate 460 is also hereby disabled, which causes the flip-flop 478 to be reset and the system to assume the state F (FIG. 5) where $P_1=1$, $P_2=0$ $P_3=0$. Thus, as described, from a present state E and with a "no-error" count input, the monitor assumes the next state F and changes from a "high" or "bad state" output to a "low" or "good state" output.

All possible state transitions and changes in output for the various inputs for the digital channel monitor depicted in FIG. 4 are indicated by its state tables shown in FIGS. 6–22. The particular state transition and output change described above is indicated in FIG. 6, rows E and F and columns labeled "0" and "output." The outputs shown on the state tables are indicated as being either "good state" or "bad state." As already mentioned, this is in reference to the state of the transmission channel 150 (FIG. 1). That is, a "good state" output indicates that the channel is being subjected to few errors while a "bad state" output indicates that considerable error is occurring on the channel. Of course, each of the different strategies requires a different combination of error count inputs to cause a "bad state" output (likewise for a "good state" output). Thus, for a particular combination of error count inputs, some strategies may indicate a "bad state" while others would indicate a "good state."

Referring again to the example just given of the monitor operating under strategy PM 000, it was shown that for a "no-error" count input, the monitor would make the state transition from present state E to a next state F and change from a "bad state" to a "good state" output. The monitor would then remain in this state until the next input. If, in this example, the monitor were operating under the fundamental mode where multiple state transitions are possible, it would not stay in state F since the entry corresponding to state F and input 0 is state A (FIG. 6). Thus the monitor would move to state A and remain there since the next state of the monitor for state A and input 0 is again A. The state table for the fundamental mode of operation is shown in FIG. 22.

FIG. 23 shows an ordering of the digital strategies according to the tendency of the particular strategies to maintain a "bad state" output of the channel monitor 170. That is, the more pessimistic strategies tend to maintain the monior in the bad state longer than do the more optimistic strategies. When the monitor indicates a bad state, the data system is maintained in a more powerful error control mode (i.e. the mode has a greater ability to control errors). The rate of information transmission, however, decreases with an increase of error control capability. FIG. 23 thus indicates which strategies provide greater protection against errors and correspondingly a decreased information transmission rate (and vice-versa).

The above may be illustrated by example by referring to strategies PM 000 (FIG. 6) and PM 001 (FIG. 7). Although the transition condition from the good state to the bad state is the same for both strategies, the transition from the bad state to the good state for strategy PM 001 requires the receipt of six error-free code words while for strategy PM 000, it requires the receipt of only five error-free words. Thus, strategy PM 001 will maintain the channel monitor in the bad state a little longer than strategy PM 000 and accordingly maintain the data system in the more powerful error control mode a little longer.

A channel monitor for use with data transmission systems employing two or more modes of error control has been described. From information received from the decoding equipment of such systems regarding the error condition of the transmission channel, the monitor determines whether or not to change the error control mode of the system. This determination is based on one of several manually preselected decision strategies. If it is determined that a change is required, the monitor signals the error control equipment accordingly.

It is noted that detailed circuit configurations for the units 100, 105, 110, 155, 160, 165 and 175 shown in FIG. 1, the unit 202 of FIG 2 and the units 435 and 481 of FIG. 4, have not been given herein because their arrangement are considered to be within the skill of the art.

Finally, it is understood that the above-described arrangements are only illustrative of the application of the principles of the present invention. Numerous other modifications and alternative arrangements may be devised by those skilled in the art without departing from the spirit and scope of the invention. For example, a channel monitor in which the various decision strategies are selected automatically rather than manually is possible. One criterion for determining when to automatically change decision strategies is the data reception rate. If the rate fell below some predetermined threshold value, the decision strategy can be automatically changed to a strategy which provides a higher data reception rate at the expense of lower reliability. Other variations of the invention are also possible.

What is claimed is:

1. An error control system which is capable of several modes of error control operation and in which data words are transmitted via a communication channel subject to noise to a receiving terminal including a decoder and associated apparatus for providing error counts indicative of the number of errors which may occur in each received data word, and a channel monitor which includes means for selecting one of a plurality of strategies to to combine the error counts of each of the received data words, means for combining the error counts of each word in accordance with the selected strategy to obtain for each word a composite representation of said counts, said combining means including a first clocking means for generating a first set of pulses, means connected to said combining means for storing said representations, and means responsive to said storing means storing a certain representation for signaling said error control system to change from one error control mode to another, said signaling means including a second clocking means for generating a second set of pulses, each pulse of said second set occurring after termination of a corresponding pulse of said first set.

2. A system as in claim 1 wherein said storing means includes a capacitor and associated means for variably controlling the current leakage from said capacitor, wherein said combining means includes a multiplicity of inputs over which said capacitor is charged, each input being connected to said associated apparatus for carrying a charge representative of a different one of said error counts, wherein said selecting means includes variable resistor means for varying the amount of charge allowed over each of said inputs, and wherein said signaling means includes a bistable means for changing said error control modes, said second clocking means periodically signaling said bistable means to assume a first state, and means responsive to the voltage on said capacitor exceeding a predetermined threshold value for signaling said bistable means to assume a second state, said bistable means activating an output lead upon assuming said second state thereby signaling said error control system to change from one error control mode to another.

3. A system as in claim 1 wherein said combining means includes a multiplicity of inputs, each of said inputs being connected to said associated apparatus for carrying a signal representative of a different one of said error counts, and digital circuitry responsive to said first clocking means for processing said signals representative of said error counts according to various selectable strategies to obtain resultants thereof, and wherein said selecting means includes first manually settable switch means for interconnecting said inputs with different portions of said digital circuitry, second manually settable switch means for interconnecting various portions of said digital circuitry with the various other portions thereof, and a third manually settable switch means for interconnecting and disconnecting said second clocking means from said digital circuitry, each combination of settings of said first, second, and third manually settable switch means enabling said digital circuitry to process said signals representative of said error counts according to a different selected strategy.

References Cited

UNITED STATES PATENTS

| | | | |
|---|---|---|---|
| 3,372,376 | 3/1968 | Helm | 340—172.5 XR |
| 3,402,390 | 9/1968 | Tsimbidis et al. | 340—146.1 |
| 3,404,373 | 10/1968 | Srinivisan | 340—146.1 |
| 3,309,671 | 3/1967 | Lekven | 340—172.5 |
| 3,134,032 | 5/1964 | Mann | 307—88.5 |
| 3,036,290 | 5/1962 | Zarouni | 340—147 |
| 3,078,443 | 2/1963 | Rose | 340—146.1 |
| 3,191,153 | 6/1965 | Bratschi | 340—172.5 |
| 3,209,327 | 9/1965 | Brandt | 340—146.1 |

OTHER REFERENCES

W. W. Peterson, Error-Correcting Codes, M.I.T. Press and John Wiley & Sons, Inc., 1961, pp. 175–181 relied on.

PAUL J. HENON, Primary Examiner

H. E. SPRINGBORN, Assistant Examiner

U.S. Cl. X.R.

340—146.1